United States Patent
Barowy et al.

(10) Patent No.: US 10,691,526 B2
(45) Date of Patent: Jun. 23, 2020

(54) AUTOMATIC ERROR FIXES FOR HIGH-AVAILABILITY APPLICATIONS

(71) Applicant: International Business Machines Corporation, Armonk, NY (US)

(72) Inventors: Daniel W. Barowy, South Deerfield, MA (US); Emery D. Berger, Amherst, MA (US); Charles M. Curtsinger, Saint Paul, MN (US); Rodric Rabbah, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 15/807,558

(22) Filed: Nov. 8, 2017

(65) Prior Publication Data

US 2019/0138383 A1  May 9, 2019

(51) Int. Cl.
*G06F 11/07* (2006.01)
(52) U.S. Cl.
CPC ...... *G06F 11/0793* (2013.01); *G06F 11/0706* (2013.01); *G06F 11/079* (2013.01); *G06F 11/0751* (2013.01)
(58) Field of Classification Search
CPC .................................................. G06F 11/0793
(Continued)

(56) References Cited

U.S. PATENT DOCUMENTS

2003/0191942 A1* 10/2003 Sinha ............... G06F 21/52
713/181

2004/0107416 A1* 6/2004 Buban ............... G06F 8/658
717/170
(Continued)

FOREIGN PATENT DOCUMENTS

WO   WO03015285 A1   2/2003
WO   WO2006073323 A1   7/2006
(Continued)

OTHER PUBLICATIONS

P. Cousot. Proving the absence of run-time errors in safety-critical avionics code. In C. Kirsch and R. Wilhelm, editors, Proceedings of the Seventh ACM & IEEE International Conference on Embedded Sofware, Embedded Systems Week, (EMSOFT 2007), pp. 1-105, Salzburg, Austria, Sep. 30-Oct. 3, 2007. ACM press.
(Continued)

*Primary Examiner* — Chae M Ko
(74) *Attorney, Agent, or Firm* — Kevin Michael Jordan; Otterstedt, Wallace & Kammer, LLP

(57) ABSTRACT

Output is obtained from a remote computer function on a first set of arguments. Responsive to determining that the output exhibits an error, a fixer routine, other than a retry, is applied to the arguments to produce new arguments. Output is obtained from the remote computer function on the new arguments. In a case where the output from the remote computer function on the new arguments is acceptable, the output from the remote computer function on the new arguments is used as a corresponding output from the remote computer function on the first set of arguments. These steps can advantageously be carried out without modifying program code of the remote computer function and without access to the program code of the remote computer function; for example, by a wrapper which black-box wraps the remote computer function.

17 Claims, 8 Drawing Sheets

(58) Field of Classification Search
USPC .............................................. 714/38.1, 38.14
See application file for complete search history.

(56) References Cited

U.S. PATENT DOCUMENTS

| | | | |
|---|---|---|---|
| 2006/0075306 A1 | 4/2006 | Chandrasekaran | |
| 2006/0150018 A1* | 7/2006 | Cousin | G05B 23/0248 714/26 |
| 2006/0259899 A1* | 11/2006 | Cooper | G06F 11/362 717/127 |
| 2007/0240118 A1* | 10/2007 | Keren | G06F 11/3684 717/124 |
| 2011/0083044 A1* | 4/2011 | Ghosh | G06F 11/3636 714/38.1 |
| 2012/0072769 A1 | 3/2012 | Goldszmidt et al. | |
| 2013/0219268 A1 | 8/2013 | Straten | |
| 2014/0289563 A1* | 9/2014 | Ghosh | G06F 11/0706 714/38.1 |
| 2015/0220269 A1* | 8/2015 | Lee | G06F 3/061 711/103 |
| 2016/0239401 A1* | 8/2016 | Li | G06F 11/3608 |

FOREIGN PATENT DOCUMENTS

| | | |
|---|---|---|
| WO | WO2011042261 A1 | 4/2011 |
| WO | WO2012078349 A1 | 6/2012 |

OTHER PUBLICATIONS

J. B. Goodenough. Exception Handling: Issues and a Proposed Notation. Commun. ACM (), 18(12):683-696, 1975 (Abstract Only pp. 1-2).

J. B. Goodenough. Structured Exception Handling. In POPL, pp. 204-224, New York, New York, USA, 1975. ACM Press (Abstract Only pp. 1-2).

H. Xi. Dependent ML: an approach to practical programming with dependent types. Journal of Functional Programming, 17(2): p. 215-286, 2007.

F. Long, V. Ganesh, M. James, S. Sidiroglou, M. Rinard. Automatic Input Rectification. In ICSE, MIT Jul. 1, 2012, p. 1-55.

Wikipedia, IDEMPOTENCE, downloaded Aug. 12, 2017 from https://en.wikipedia.org/wiki/Idempotence, pp. 1-7.

Martin Monperrus. "Automatic Software Repair: a Bibliography", Technical Report #hal-01206501, University of Lille. 2015. pp. 1-34.

Perkinsα, Jeff H., et al., "Automatically Patching Errors in Deployed Software", (2009), Proceeding SOSP '09 Proceedings of the ACM SIGOPS 22nd symposium on Operating systems principles pp. 87-102 Big Sky, Montana, USA—Oct. 11-14, 2009 (reprint pp. 1-16).

Swarat Chaudhuri, Sumit Gulwani, and Roberto Lublinerman, Continuity and Robustness of Programs, CACM Research Highlight, Aug. 2012 | vol. 55 | No. 8 | communications of the acm p. 107-115.

Wikipedia, Continuous Function, downloaded Aug. 12, 2017 from https://en.wikipedia.org/wiki/Continuous_function, pp. 1-19.

\* cited by examiner

```
object ResiliencyEnhancementApp extends App {

// my program
    val p : (String) => Double = ...

// my fixers
    val fixers = Set(
        new Identity[String,Double](),
        new StringFixer[String,Double]()
    )

// init retry
    val retry = new Retry[String,Double](
            p, Set(NaN), fixers, EditDistance
    )

// call Resiliency
    val output = retry.callResiliently(input)
}
```

FIG. 6

AUTOMATIC ERROR FIXES FOR HIGH-AVAILABILITY APPLICATIONS

BACKGROUND

The present invention relates to the electrical, electronic and computer arts, and, more particularly, to programming languages & compilers, and the like.

Reusable software components are now widely available from numerous sources: standard programming language libraries, third-party libraries, online code repositories, as well as web service application programming interfaces (APIs). A typical mobile application with social networking capabilities may even make use of all of these facilities. Nonetheless, very few software components make their quality guarantees known to consumers. In the case of web services, communication over inherently unreliable networks means that even reliable components need to expect intermittent faults. Unfortunately, prior research shows that programmers rarely handle faults correctly. Given a long enough running time, the chance that a program will encounter at least one error-inducing input is high.

SUMMARY

Principles of the invention provide techniques for automatic error fixes for high-availability applications and the like. In one aspect, an exemplary method includes obtaining output from a remote computer function on a first set of arguments; responsive to determining that the output exhibits an error, applying a fixer routine, other than a retry, to the arguments to produce new arguments; obtaining output from the remote computer function on the new arguments; and, in a case where the output from the remote computer function on the new arguments is acceptable, using the output from the remote computer function on the new arguments as a corresponding output from the remote computer function on the first set of arguments.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a non-transitory computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments improve the functioning of a computer itself by taking action when exceptions occur to keep the program running—one example of an exception that can occur when a program is running is an error code which causes the program to crash; i.e., no longer execute. One or more embodiments prevent a crash by capturing the exception and attempting one of several different solutions which are either a priori computed or developed by the programmer, who determines what policies should govern exceptions. For example, suppose communication is attempted to an outside remote service via the Internet, and that this fails due to a network error. The program could crash, or there could be a retry, or there could be a graceful termination by returning an error code. These represent three possible policies. One or more embodiments attempt sensible polices; for example, "retry" in response to a failed network connection. In another non-limiting example, suppose some data is received by some mechanism; for example, over a network, from a disk file, reading from memory, or the like, and it is desired to process it. Suppose a string was received and it is desired to parse the string, but that this fails due to a missing quote. An exemplary policy that could be implemented in response includes determining what character must be added or deleted from the string to enable it to be parsed. This addition or removal is implemented, thus preventing the program from crashing. Another non-limiting example is a divide by zero, which will typically cause the program to crash or return a nonsensical result. An exemplary policy could include changing the zero divisor to a one. One or more embodiments determine the most reasonable substitution based on previous executions of the program. For example, if a historical analysis indicates common instances of division by one, or two, or three, as the case may be, the divisor causing the error is replaced by a reasonable alternative value. In the case of the example of the failure to parse a string, a suitable inquiry includes the number of characters that need to be added or removed to permit the string to be parsed. "Retry" is merely a special case where nothing is done other than retrying the same operation again without any change. This works quite well for distributed programs with network partitions. In one or more embodiments, based on observance of the program history; for example, under the direction of the programmer, infer a deletion or addition to a string or the like.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 depicts exemplary computer code, according to an aspect of the invention;

DETAILED DESCRIPTION

Figure 1:
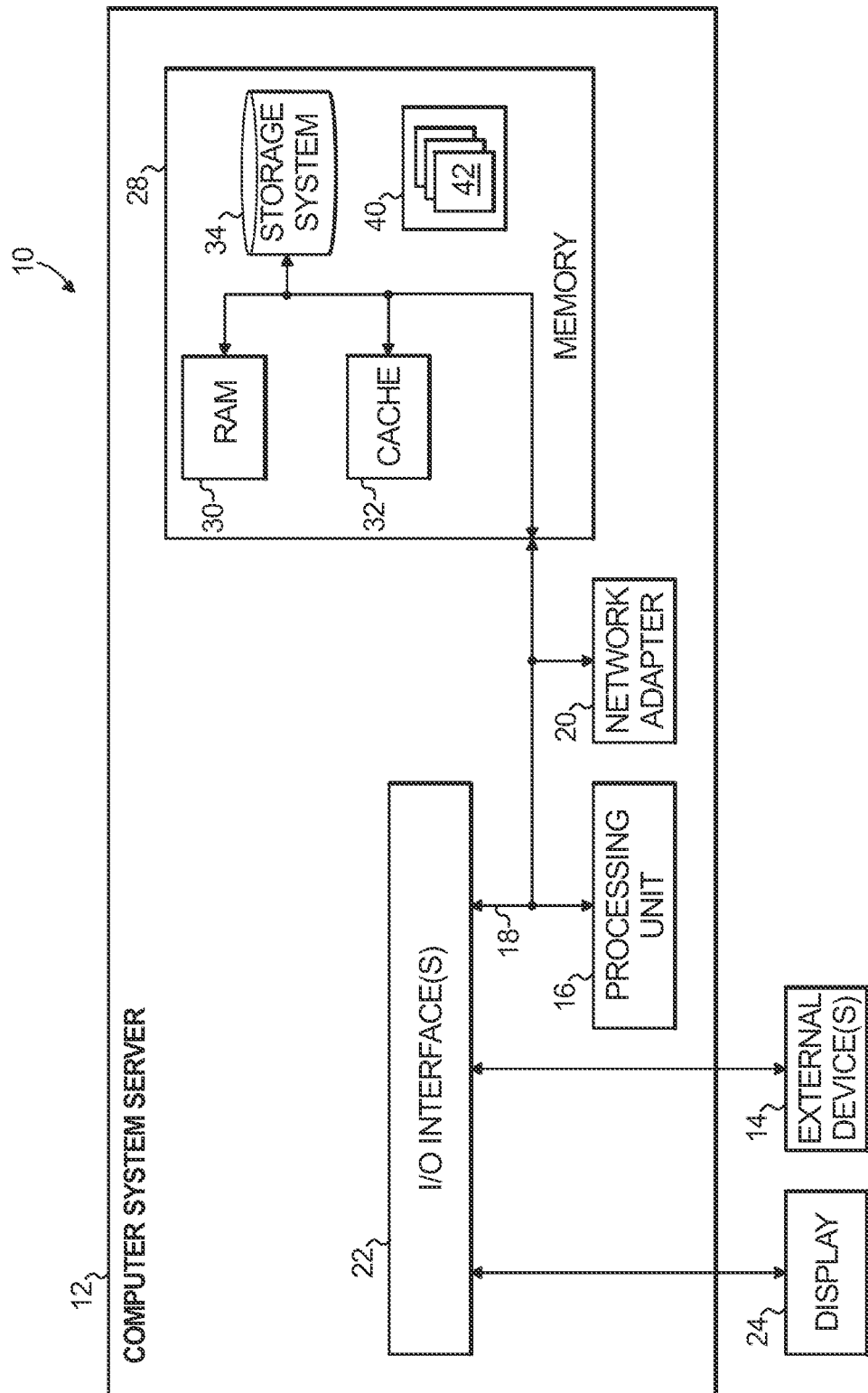
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
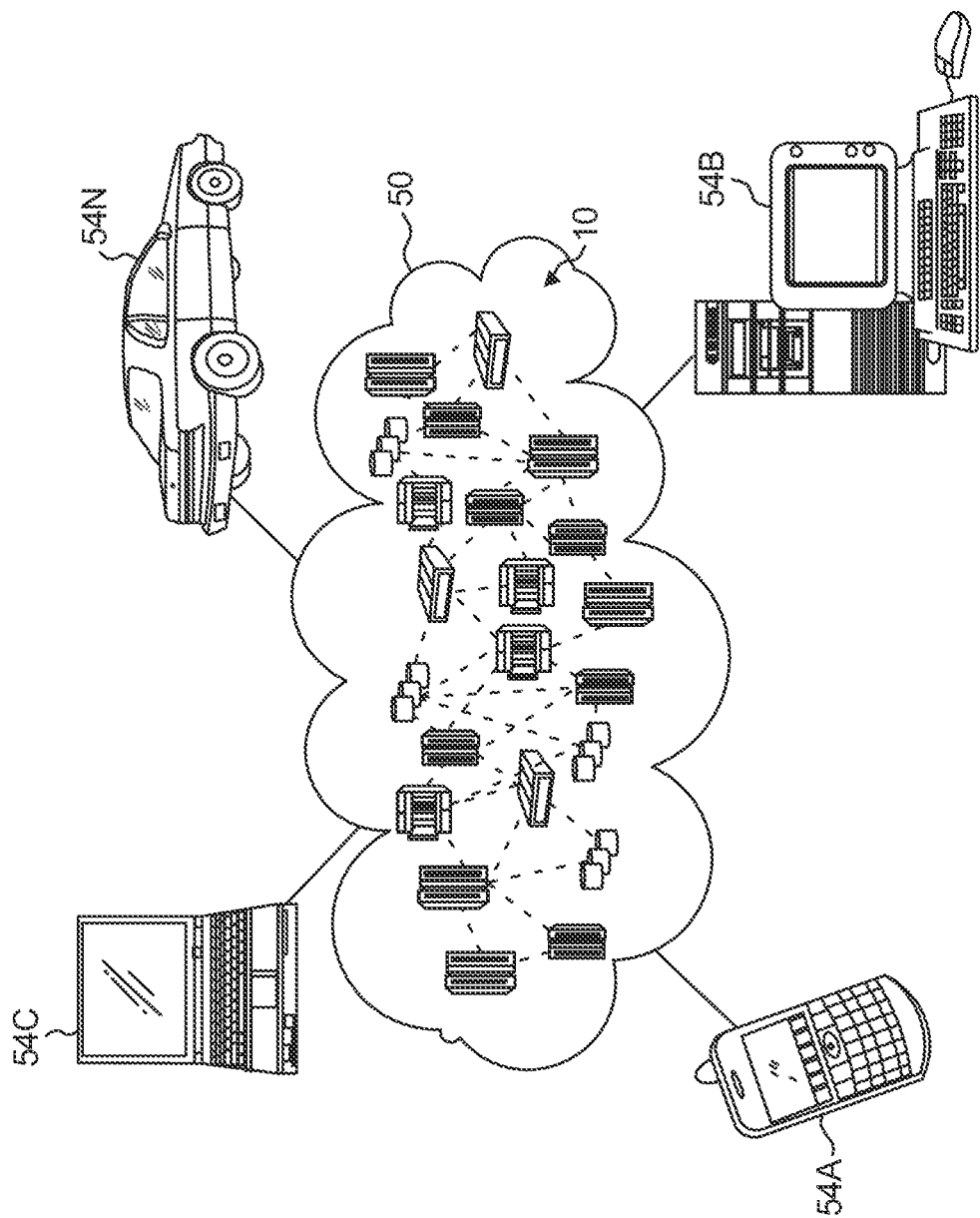
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
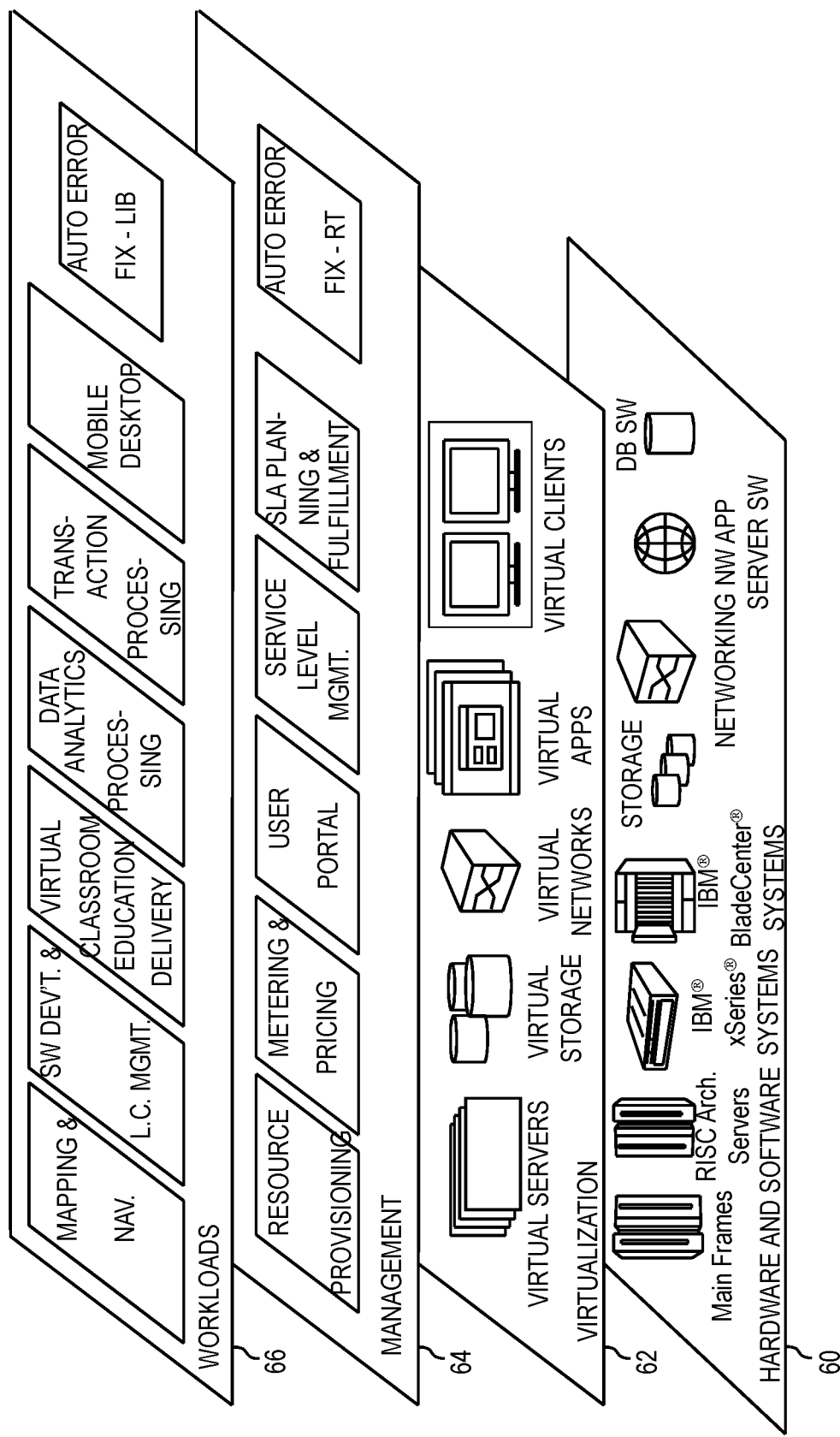
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM Blade Center® systems; storage devices; networks and networking components. Examples of software components include network application server software, in one example IBM Web Sphere® application server software; and database software, in one example IBM DB2® database software. (IBM, zSeries, pSeries, xSeries, Blade Center, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop. In some instances, aspects of the invention can be located in the workload (application) layer 66—for example, as part of a library "AUTO ERROR FIX-LIB" that is compiled in, or linked against running code. In other instances, aspects of the invention can be located in the management layer 64 as part of service management—for instance, a program may be observed by a runtime "AUTO ERROR FIX-RT" running in the cloud; when this cloud-based runtime detects program failure, it seeks to recover using one or more techniques set forth herein. For example, one or more embodiments provide a "service to a service"—a web service could be provided and then a further service could be provided of monitoring the web service for failure and upon detecting a failure, pursuing recovery using one or more techniques set forth herein. In still other instances, functionality is split between layers 64 and 66.

As noted, reusable software components are now widely available from numerous sources: standard programming language libraries, third-party libraries, online code repositories, as well as web service APIs. A typical mobile application with social networking capabilities may even make use of all of these facilities. Nonetheless, very few software components make their quality guarantees known to consumers. In the case of web services, communication over inherently unreliable networks means that even reliable components need to expect intermittent faults. Unfortunately, prior research shows that programmers rarely handle faults correctly. Given a long enough running time, the chance that a program will encounter at least one error-inducing input is high.

One or more embodiments advantageously provide a black-box robustness wrapper that eliminates program exceptions. On unexceptional program runs, the technique returns the program's result as-is. When program failures occur, the technique optionally logs the failure for offline debugging and then takes corrective action, returning a new program output. The new output is generally the best approximation to the intended output that may be found within a user-specified time bound. The technique leverages the observation that for many programs, similar inputs produce similar outputs, a property called "program continuity." Further regarding the black-box robustness wrapper, the terminology "black box" is used to convey the idea that the program itself does not necessarily need to know how the wrapper functions. The service making the corrections has, in one or more embodiments, pre-built policies; e.g., retry, divide by substitute divisor, and the like. The black-box robustness wrapper monitors the program execution, including data and instructions, and uses this inside the "black box" to build new models. The program only "sees" that upon an exception, it jumps to a different point in the execution. It does not necessarily have to look inside the robustness wrapper. Thus, for the avoidance of doubt, the operation of the black-box robustness wrapper is fully disclosed and enabled herein; the term "black box" merely indicates that in one or more embodiments, the robustness wrapper is a "black box" (i.e., transparent) to the executing program.

Static program analysis is capable of verifying the presence or absence of certain kinds of bugs before a program is put into production, which, needless to say, is advantageous. One of the most successful techniques in this regard is static type safety, a feature that is present in a large number of programming languages, including Java. Static type safety means that certain errors are guaranteed not to occur at runtime for any program that passes safety checks at compile-time. Nonetheless, precisely how to extend type safety to all errors remains an open problem.

Efforts to reduce the number of possible errors that surface at runtime have only been partially successful. Type systems present in popular languages are incapable of detecting errors such as arithmetic overflow and underflow, divide by zero, etc. Recent efforts address these problems by building new languages with more powerful type systems or by severely restricting the use of certain language features, such as memory allocation, recursion, and library use. Other errors, such as those related to resource availability, fundamentally cannot be found at compile-time. Combined with the fact that industrial programmers are moving toward languages with weaker guarantees like JavaScript, which checks for errors solely at runtime, runtime errors are likely to remain a concern for the foreseeable future.

The recognition that exceptional program conditions are unavoidable led to the creation of structured exception handling (SEH) in the 1970s. SEH provides a unified interface for handling runtime errors and is present in many, if not most, modern programming languages. The presence of SEH in a language does not mean that all runtime errors can be corrected; rather, it provides a mechanism for correcting errors when detected. For example, latent errors introduced by an incorrect algorithm may or may not throw an exception depending on whether the appropriate runtime check is present.

One or more embodiments build on structured exception handling by providing automatic fault handlers for ordinary programming languages where runtime exceptions are common. One or more embodiments reduce the programming burden for programmers because they can focus on fault detection instead of fault correction. One or more embodiments provide a straightforward tradeoff: otherwise fatal runtime faults can be completely eliminated by accepting an approximation of the expected result. One or more embodiments are appropriate to use, for example, when program availability is more important than correctness.

One pertinent aspect in one or more embodiments is that, despite the discrete nature of program inputs and outputs, many programs are nonetheless well-behaved and predictable. In fact, the relationship between inputs and outputs for many programs fits a generalization of the mathematical notion of "continuity": small changes in input cause small changes in output. Thus when encountering program errors, one or more embodiments use the program itself to search for a similar input, which when given as input, yields a similar output. One or more embodiments thus approximate the correct program behavior when the program would otherwise crash. As will be disclosed herein, simply retrying the program on the same input is a degenerate case of the more general technique, and for web-based services, simply retrying a request is sufficient to recover from a program failure.

One or more embodiments only intervene when a program encounters an error condition and do not change defined program behavior. Instead of crashing, one or more embodiments find the best approximation for undefined behavior within a user-specified time bound. One or more embodiments focus on a well-behaved subset of programs where bugs are nonetheless hard to avoid: stateless, side-effect-free, deterministic programs. This class of programs is increasingly popular because their properties mean that they are scalable, composable, and easier to debug than traditional programs. They thus find applications where reliability is important, e.g., streaming programs, industrial control software, and the internet of things (IoT), to name a few.

Figure 4:
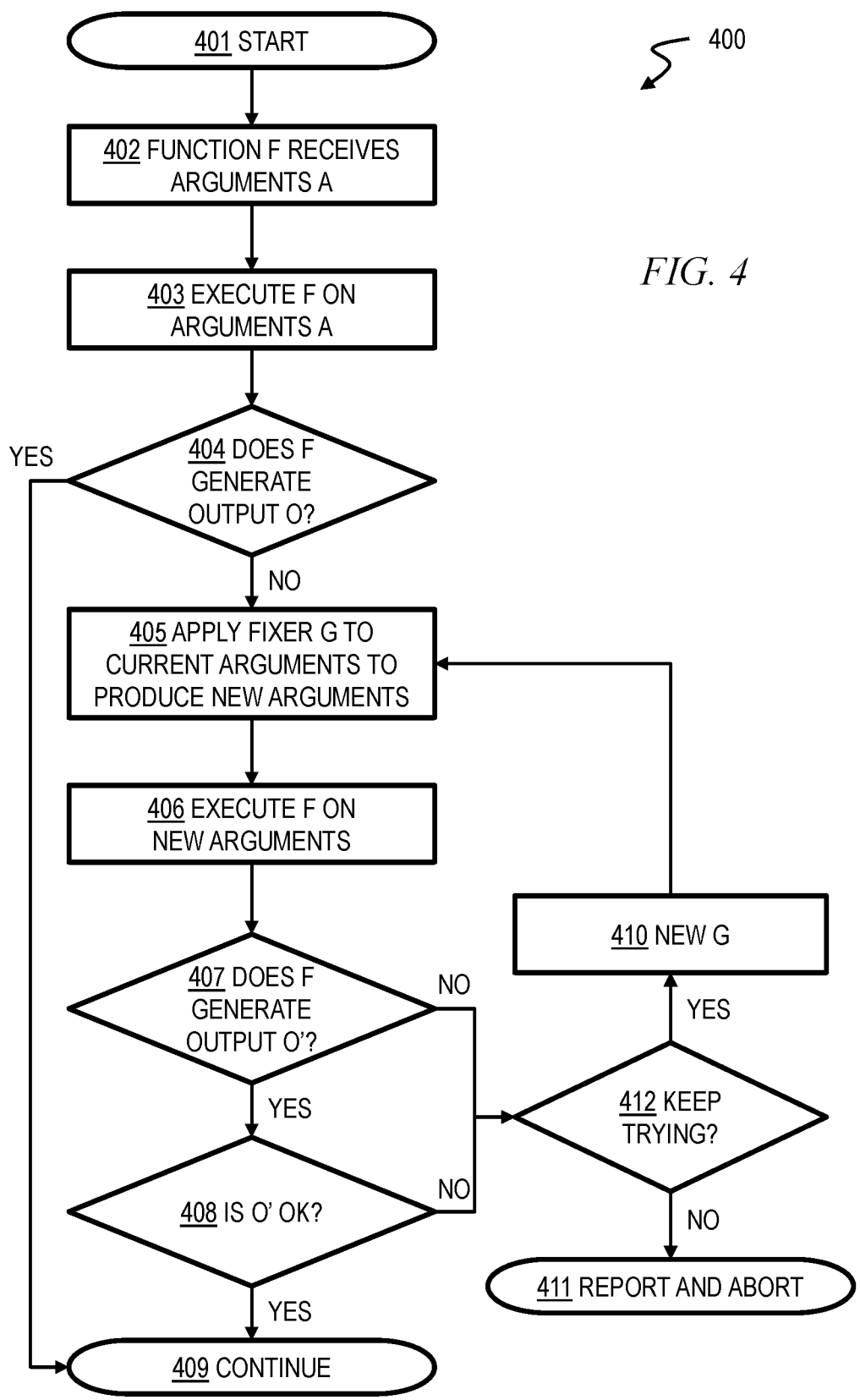
FIG. 4 depicts a flow chart of an exemplary method, according to an aspect of the invention.

In one or more embodiments, given some I/O operation, or more generally, any function F, referring to the flow chart 400 of FIG. 4 which begins at 401, in step 402, F receives some arguments A. In step 403, execute F, applying arguments A. In step 404, observe if F generates an output O. In step 405, if F fails to produce an output O, apply a fixer G to A to produce new arguments A'. If F does produce an appropriate output O, simply proceed to "continue" block 409 and await another invocation of the flow logic. In step 406, repeat step 403, applying new arguments A' this time. In step 407, observe if F produces an output O'. In step 408, of so, evaluate if O' is acceptable output for F using acceptance criteria. If O' is acceptable, proceed to "continue" block 409 and await another invocation of the flow logic. On the other hand, in decision block 412, if either F does not generate output O' or if O' is not acceptable, determine whether addition efforts are to be made by applying an alternative fixer. If so, in step 410, apply a new G and repeat step 405 with this new fixer G. In step 411, if flow fails to produce an acceptable output O' and no further fixup attempt is to be made, abort and report the error.

In one or more embodiments, the fixer G is one of a set of fixers, which can be system-defined or user-defined. The set of fixers need not be static; it may grow over time subject to observation of input A and output O produced by F and learning an acceptable output for input set.

In one or more embodiments, the identity function is a valid fixer (so that A'≡A and hence F is retried on the original arguments ("RETRY")).

The flow from 410 to 405 may be subject to a fixing budget (so that if the budget is exhausted, the process aborts and reports the failure) (i.e., "NO" branch of decision block 412).

The acceptance criteria in block 408 may be system defined, learned (by observation, sampling and learning) or user defined. For example, if A is the original value and A' is the new value, if A and A' are numerical values, one acceptance criteria would be that A' does not vary from A by more than a predetermined percentage. Purely by way of example and not limitation, in one aspect, if A is 99, then A' can be no more than 102; A' cannot be, e.g., 10,000. Purely by way of another example and not limitation, suppose A and A' are string values. A suitable acceptance criterion could be, for example, delete or add no more than a certain number or percentage of string characters. For example, delete only one character or no more than a certain percentage (e.g., 10%) of the characters in the string. The policy could differ depending on the length of the string. The acceptance criteria could therefore vary depending on the type of the value (integer, floating point, etc.). For example, for an integer type, a range might be specified; for a floating point type, one might specify no change in the precision by more than two or three significant digits; for a string type, the specification might be related to the string length; for an object type that perhaps contains a dictionary, the specification might state that no more than a certain number of keys could be changed in the dictionary. Thus, in one or more embodiments, the acceptance criterion typically depends on the argument type. Given the teachings herein, the skilled artisan will be able to select an appropriate acceptance criterion or criteria.

One or more embodiments advantageously provide a method to automatically recover from a failed execution of a program P applied to an input I. The method includes observing failure of P applied to I; generating new input I'; and applying P to I'. New input I' can be generated, for example, by applying the identity function; by applying a system provided fixer function; and/or by applying a plurality of system provided fixer functions and evaluating which of the outputs produced by P are acceptable.

In some cases, acceptability is determined by applying a plurality of acceptance criteria.

Figure 7:
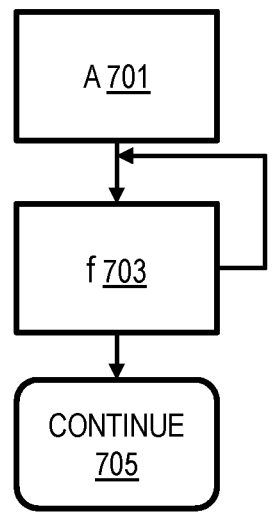
FIG. 7 depicts sequential application of fixer functions, according to an aspect of the invention.

In some cases, the system applies the fixer functions in sequence until a budget is exhausted. As seen in FIG. 7, in this sequential aspect, there is an additional input A 701 which is fed to fixer f 703; iterate, eventually, break out of the loop and continue at 705.

Figure 8:
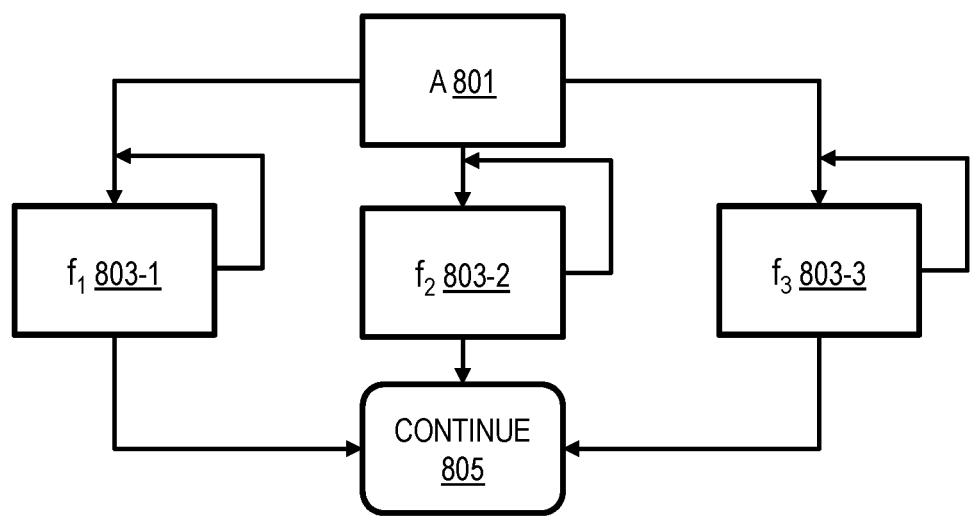
FIG. 8 depicts parallel application of fixer functions, according to an aspect of the invention.

In some cases, the system applies the fixer functions in parallel until a budget (e.g., time list) is exhausted. In this aspect, try a number of different fixer functions at the same time (in parallel) and see which one(s) generate an acceptable output. As seen in FIG. 8, in the parallel aspect, there are multiple fixers (say, by way of example and not limitation, three fixers $f_1$, $f_2$, and $f_3$ numbered 803-1, 803-2, and 803-3). Start all three fixers in parallel on input A 801; each may have its own acceptance criteria. They iterate and when they are ready, they emit the value; in some embodiments, the continuation function 805 accepts the first fixer-emitted value which is acceptable. The acceptance criteria can be part of the fixer in one or more embodiments; i.e., each fixer $f_1$, $f_2$, and $f_3$ checks for acceptability in parallel. At a given point in time each fixer does or does not have an output. If two or more have outputs, select the appropriate output using a policy; for example, take the first that yields an acceptable result, or compare and contrast and see which one is better. A different number of fixers could be used in other embodiments.

Figure 5:
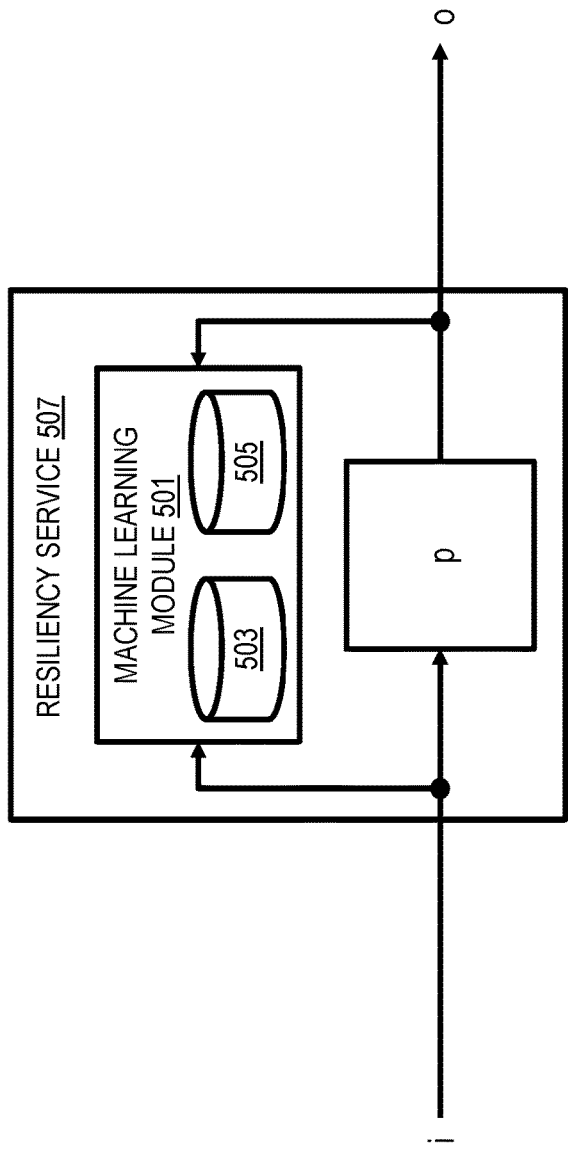
FIG. 5 depicts an exemplary model of a program for which inputs are perturbed in response to an unacceptable output, according to an aspect of the invention.

In one or more embodiments, the system can observe and sample the execution of P in inputs $I_1$, $I_2$ . . . $I_j$ producing outputs $O_1$, $O_2$ . . . $O_j$. In this aspect, train the model(s) ahead of time and permit them to learn before the code is actually deployed and run on the real values. For example, as seen in FIG. 5, carry out machine learning (e.g. with module 501) on a training corpus 503 that deliberately includes errors, and then apply the trained system to actual problems (typically after first verifying on a test corpus 505).

In one or more embodiments, the system generates a few fixer functions for an input I' by mapping it to the closest $I_j$. That is to say, if there are a number of different candidate new inputs or new arguments, look for the one that is closest to the original argument that caused the error.

One or more embodiments thus provide automatic error fixes for high-availability applications. While web services are widely used, they do suffer from some drawbacks. They are used by users who did not write them and thus cannot fix them when there are bugs; they may be written in bug-prone languages such as Node.js. In this regard, Node.j s is not a type-checked or statically-typed language. When a value is assigned to a variable in the program, the programmer is not permitted to state that the variable is of a certain type; e.g., integer. Thus, the programmer might use a variable assuming that it has a value of an integer but it might actually have the value of a string. This could cause a problem. In contrast, many other languages permit making declarations such as requiring that a variable have a value other than null. Other troublesome aspects of web services include semantics being often unclear and subject to change while in use; and/or coupling being via a best effort network such that intermittent failure is expected. For the avoidance of doubt, note that web services are a non-limiting example of a type of program that can benefit from use of embodiments of the invention; not being statically-typed is a non-limiting example of a language feature that can be problematic, and Node.js is a non-limiting example of a statically-typed problematic language.

One or more embodiments advantageously provide an automatic exception handler which learns from exception-free runs and takes action when exceptions occur to keep the program running. One or more embodiments are suitable for use, for example, in situations that are deterministic (except for intermittent failures), stateless, side-effect free, and "mostly continuous."

Referring to FIG. 5, in one or more embodiments, a program p has an input i contained in I (the set of all possible inputs) and returns a corresponding output o=p(i). In some instances, p will fail. One or more embodiments address such potential failure by defining a function f(p, i) which returns i when p(i) is defined and i+ε when p(i) is not defined. Ideally, p(f(p, i)) will be approximately equal to p'(i) where p'(i) is the intended correct function. Thus, in one or more embodiments:

p(f(p, i))≈p'(i).

It is important to note that a "fixer" in accordance with one or more embodiments modifies the input rather than the program.

It will be appreciated that a simple "retry" is a degenerate case where ε=0 and the same input is tried again.

One or more embodiments advantageously provide techniques for combining fixers. Define a distance function for I, namely, d(i, i'). A function g with arguments of program, several inputs, several fixers, the distance function, and time is then defined:

g: (Program, Input, Input, Fixers, Distance, Time)→Output g(p, i, $i_a$, {$f_1$ . . . $f_n$}, d, t)≈p'(i)

Thus, in one or more embodiments, g selects the best available approximation according to d in available time t (see discussion of acceptance criterion), with several possible inputs i, $i_a$ . . . and several possible fixers $f_1$ . . . $f_n$.

For illustrative purposes, consider a program which is supposed to return y=sin(x), but has a bug for x values near π. In a non-limiting example, the following code can be provided to deal with this bug:

```
try {
        sin(x)
}       catch {
        case _ => sin(x+ε)
}
```

This approach is workable because the sine function is continuous, i.e., in the limit as x approaches c, f(x)=f(c); f(x) can be made as close as desired to f(c) by making x close to c. That is to say, "similar inputs" yield "similar outputs."

Many programs are also "continuous." Refer, for example, to Continuity and Robustness of Programs, S. Chaudhuri, S. Gulwani, and R. Lublinerman, CACM Research Highlight, August 2012, expressly incorporated herein by reference in its entirety for all purposes. Examples of such "continuous" programs include sorting algorithms, shortest-path algorithms, minimum spanning tree algorithms, and knapsack algorithms.

Fixers in accordance with one or more embodiments can come in many forms—for example: the aforementioned identity function; Input validators (e.g., JSON should be well-formed); Databases (e.g., most representative k inputs); Statistical models (e.g., Markov chains, hierarchical models, etc.); and the like.

One or more embodiments do not require a static analysis, and indeed, do not require access to the code of the application for which automatic error fixing is to be applied. One or more embodiments are generally applicable to a variety of errors; for example, are not limited to C memory errors. One or more embodiments perturb the input rather than truncating or deleting it. Advantageously, one or more embodiments do not require use of a ticketing tool or user input to identify errors and/or do not require error correction through an input device. One or more embodiments can change the behavior of deployed software by changing the input to the software, and do not require corrective actions preconfigured in advance; indeed, do not make changes to the software per se.

We have developed an exemplary implementation for experimental purposes, which includes approximately 3000 lines of Scala and 800 lines of Java. The exemplary experimental implementation is language-agnostic, and wraps JVM, Node.js, and Node-RED programs. The exemplary experimental implementation has fixers for three datatypes: Double, String, and JS prog.text.

FIG. 6 shows exemplary code including program and "fixer" declarations as well as calls to the appropriate fixer in case of an error. One or more embodiments employ a program resiliency enhancement module to provide a resiliency service.

We have applied our experimental implementation to a program that computes a complex logarithm, where it has successfully dealt with an error resulting from inputting a value of zero; to a mean word length program, where it has successfully dealt with an error in the form of a divide by zero on an empty string; to a sentiment analysis program, where it has successfully dealt with an error in the form of the word "constructor"; and to the ESLint JavaScript linter, where it has successfully dealt with an error in the form of an exception on a malformed JSDoc.

Given the discussion thus far, it will be appreciated that an exemplary method, according to an aspect of the invention, includes the step of obtaining output O from a remote computer function p on a first set of arguments i. In this context, "output" can include, for example, erroneous output and/or an indication that program has "bombed" without returning usable output. The output may be obtained, for example, over a network or by observing a memory location. A further step 405 includes (e.g. from NO branch of block 404 because expected correct output O has not been obtained), responsive to determining that the output exhibits an error (as noted, can include, e.g., erroneous output or a returned indication that the program has "bombed" without returning usable output), applying a fixer routine G, other than a retry, to the arguments to produce new arguments.

A further step includes (e.g., YES branch of block 407) obtaining output from the remote computer function on the new arguments; and, in a case where the output O' from the remote computer function on the new arguments is acceptable (YES branch of 408 e.g.), using the output from the remote computer function on the new arguments as a corresponding output from the remote computer function on the first set of arguments.

As noted, one pertinent aspect of one or more embodiments is the ability to run as a black box; i.e., from the program's point of view, no changes are needed (by way of example, no re-compilation is needed). This is enabled in one or more embodiments by architecting the solution as a wrapper (resiliency service 507) on the program p, such that the program does not need to be recompiled and such that no access to the program's source code is required.

In one or more embodiments, based on observance of the program history; for example, under the direction of the programmer, an exemplary fixer G could infer a deletion or addition to a string or the like. The steps described above can advantageously be performed via a resiliency service wrapper 507 that wraps program p. In one or more embodiments, to determine whether the output O' is acceptable, use, e.g., a decision block based on criteria discussed herein; if acceptable then take the output O' and supply it back through a logical port to the output of program p in FIG. 5

As noted, advantageously, in one or more embodiments the steps are carried out without modifying program code of the remote computer function and without access to the program code of the remote computer function.

A non-limiting example of a remote computer function includes a web service accessed via a web service application programming interface.

Some embodiments further include selecting the fixer routine from a plurality of fixer routines 803-1, 803-2, and 803-3 as described elsewhere herein.

Some embodiments further include adding at least one additional fixer routine to the plurality of fixer routines via a learning process as described elsewhere herein (e.g. using module 501).

Figure 9:
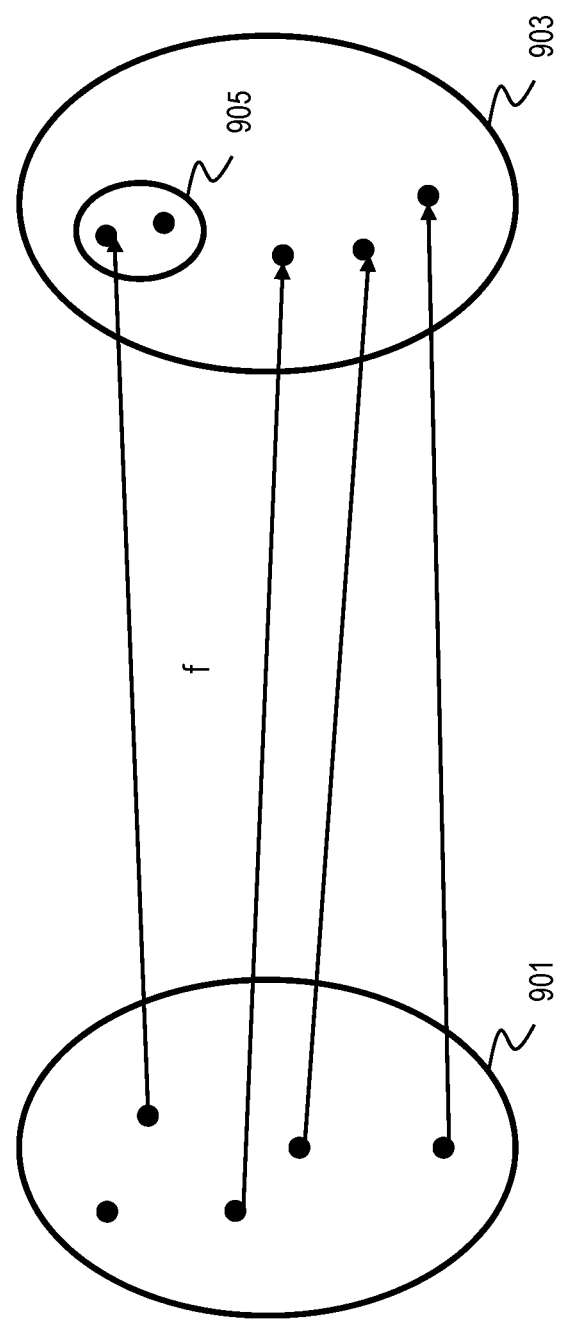
FIG. 9 illustrates aspects of program continuity pertinent to implementation of one or more embodiments.

In one or more embodiments, the remote computer function is a continuous program. As used herein, a program is said to be continuous when it is contextually analogous to a continuous function in mathematics; i.e., a function for which sufficiently small changes in the input result in arbitrarily small changes in the output. For example, if p is a random number generator, techniques of embodiments of the invention will typically not function successfully (input not correlated with output). On the other hand, if p counts the number of characters in a string that it is given as input, techniques of embodiments of the invention will typically function quite successfully. For example, suppose the program p is a labelling engine which, given an input digital picture, outputs a label (one or more words describing the picture). Suppose this program labels a picture of a cat "cat"; techniques of the invention will likely be able to label a corrupted picture of a cat as "cat" in response to a program crash. Referring to FIG. 9, a function f takes inputs from a space 901 and maps them to outputs in a space 903. Considering the top arrow in FIG. 9, a small change in the input (left endpoint) should result in the output staying within the neighborhood 905 from the original output (right endpoint). In some instances, appropriate percentages of acceptable change can be determined using a learning process with module 501.

In one or more embodiments, the continuous program is a stateless, side-effect free, and deterministic program. In mathematical terms, this aspect is referred to as "Idempotence" or a "pure function." If the program p to which the resiliency service 507 is possibly to be applied has some very critical function (e.g., opens the spillway to a dam), it may not be appropriate to retry on p because serious consequences might ensue. Opening the spillway to a dam is an observable output. If, for the same input, p always produces the same output, then one or more techniques of the invention can be applied. An idempotent program or function is not reading some memory that somebody else can mutate or modify. If someone were allowed to mutate or modify, this would affect the output.

In one or more embodiments, the plurality of fixer routines include an identity function, an input validator, a database storing a most representative group of inputs, and a statistical model.

As noted, in some instances, in a case where the output from the remote computer function on the new arguments is not acceptable (e.g. NO branch of block 408), if a fixing budget has not been exceeded (YES branch of block 412), apply another fixer routine (new G step 410) to the arguments to produce further new arguments. The new G is typically applied to the original arguments, but in an alternative approach, the new G could be applied to the arguments produced by the previous G so as to refine same.

Further steps then include obtaining output from the remote computer function on the further new arguments (result of 406 when re-running on the further new arguments), and, in a case where the output from the remote computer function on the further new arguments is acceptable (YES branch of 408), using the output from the remote computer function on the further new arguments as a corresponding output from the remote computer function on the first set of arguments.

It is worth noting that the wrapper 507 may or may not send a message to the program p (e.g. a remoted web service) service saying that it did a fixup. This might be desirable where, for example, a charge is being made to clients for fixing their programs, such as in a cloud setting, or as a courtesy alert suggesting that the program p should be fixed by the client. This could involve, for example, a logging mechanism to alert the user and/or program.

Developing fixers: In one aspect, a human agent (programmer) develops the policies—the fixer strategies and also the acceptance criteria and the selection. In another aspect, a learning engine (e.g. module 501) begins with an initial seed of pre-populated policies (e.g., retry, delete a character, add one and divide), and then by learning the inputs and outputs, it determines how to add new policies. Suitable machine learning techniques for developing and/or selecting fixers include Hidden Markov Models (HMMs), neural networks, gradient descent, support vector machines, and the like.

Selecting fixers: In one or more embodiments, start with a predefined set of policies. Select based on distance criteria (domain-specific). So, if a number is being changed and it is supposed to be integral, do not deviate by a percentage. For a floating point example, see the sine discussion. There is an initial seed of distance functions. For strings, it might be a Manhattan distance (i.e., the distance between two points in a grid based on a strictly horizontal and/or vertical path (that is, along the grid lines), as opposed to the diagonal or "as the crow flies" distance—the Manhattan distance is the simple sum of the horizontal and vertical components, whereas the diagonal distance might be computed by applying the Pythagorean theorem). For precision, it might be that "we don't change more than a significant digit." There is a domain-specific distance function for every type of input; typically human-generated. The system starts with those and uses a learning process to learn, adapt, and develop new ones.

Acceptance criteria: Start with the seeds. For a given type of input (e.g., integer, string, floating point, object, array . . . ) the system is pre-populated with a set of acceptance criteria; e.g., the string has not changed length by more than x characters. The system then learns more. In the context of sequential (FIG. 7), that is all; in the context of parallel (FIG. 8), where a constraint budget is being imposed, consider whichever returns first (although other approaches could be used in other embodiments, such as waiting till the budget is exhausted and then picking the best one). This can vary depending on the application—e.g., whether speed or accuracy is most important.

One or more embodiments of the invention, or elements thereof, can be implemented in the form of an apparatus including a memory and at least one processor that is coupled to the memory and operative to perform exemplary method steps. For example, a non-transitory computer readable medium includes computer executable instructions which when loaded into the memory configure the at least one processor to be operative to instantiate a wrapper which black-box wraps the remote computer function and carries out the described method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-3 and accompanying text. Note, e.g., the rightmost "AUTO ERROR FIX-LIB" and "AUTO ERROR FIX-RT" (RT=RUNTIME) functionality in layers 64 and 66.

It should be noted that any of the methods described herein can include an additional step of providing a system comprising distinct software modules embodied on a non-transitory computer readable storage medium; the modules 42 can include, for example, any or all of the appropriate elements depicted in the block diagrams and/or described herein. One pertinent aspect of one or more embodiments is the ability to run as a black box; i.e., from the program's point of view, no changes are needed (by way of example, no re-compilation is needed). This is enabled in one or more embodiments by architecting the solution as a wrapper on the program, such that the program does not need to be recompiled and such that no access to the program's source code is required. Referring to FIG. 5, original program p receives input i and produces output O. The input and output may be received from/sent to a file, a network, or the like. Program P is run in the context of resiliency service RS 507 according to an embodiment of the invention. Resiliency service RS taps into the input and the output so that it can observe the operation of program p. By being able to monitor the input and the output, the resiliency service RS is able to learn about the functionality of program p without the need to have access to the source code or other internal functionality of program p. By simply learning and observing a sufficient number of inputs and outputs, the resiliency system RS can learn and use the results to build internal models. An error is detected, for example, by determining that the produced output is surprisingly different from what was expected or the program crashes. The resiliency system RS then "kicks in" and re-runs the program on the input it just ran on or on a newly generated input. This can be part of the training process as well, making use of machine learning module 501, training corpus 503, and test corpus 505 as described above.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI). This could be used, for example, in the case of a web-based solution. It is worth noting that the OpenWhisk serverless event-based programming service is of interest in one or more embodiments. Reference is made to the OpenWhisk project, which contains the source code behind IBM Bluemix OpenWhisk. OpenWhisk provides a cloud-native event-based programming system where event handlers are called actions. "Serverless" is defined herein as referring to a cloud-native platform for short-running, stateless computation and event-driven applications which scales up and down instantly and automatically and charges for actual usage at a fine (e.g., millisecond) granularity. In Open Whisk, the program is single-function. Programs may in general be a composition of many functions; however, in serverless or Open Whisk aspects, a program is a single function. Resiliency Service RS can be applied in that context where the input and output of a single function are being observed; in some cases, all output is routed to the service. So, one or more embodiments are applicable, for example, in the domain of serverless computing.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining output from a remote computer function on a first set of arguments;
   responsive to determining that said output exhibits an error, applying a fixer routine, other than a retry, to said arguments to produce new arguments;
   obtaining output from said remote computer function on said new arguments; and
   in a case where said output from said remote computer function on said new arguments is acceptable, using said output from said remote computer function on said new arguments as a corresponding output from said remote computer function on said first set of arguments;
   the method further comprising selecting said fixer routine from a plurality of fixer routines, wherein said plurality of fixer routines comprise an identity function, an input validator, a database storing a most representative group of inputs, and a statistical model.

2. The method of claim 1, wherein said steps are carried out without modifying program code of said remote computer function and without access to said program code of said remote computer function.

3. The method of claim 2, wherein said steps are carried out by a wrapper which black-box wraps said remote computer function.

4. The method of claim 3, wherein said remote computer function comprises a web service accessed via a web service application programming interface.

5. The method of claim 1, wherein applying a fixer routine to said arguments to produce new arguments comprises applying said plurality of fixer routines in parallel to said arguments to produce a corresponding plurality of sets of new arguments.

6. The method of claim 1, further comprising adding at least one additional fixer routine to said plurality of fixer routines via a learning process.

7. The method of claim 3, wherein said remote computer function comprises a continuous program.

8. The method of claim 7, wherein said continuous program comprises a stateless, side-effect free, and deterministic program.

9. The method of claim 1, further comprising:
   in a case where said output from said remote computer function on said new arguments is not acceptable, if a fixing budget has not been exceeded, applying another fixer routine to said arguments to produce further new arguments;
   obtaining output from said remote computer function on said further new arguments; and
   in a case where said output from said remote computer function on said further new arguments is acceptable, using said output from said remote computer function on said further new arguments as a corresponding output from said remote computer function on said first set of arguments.

10. A method comprising:
    obtaining output from a remote computer function on a first set of arguments;
    responsive to determining that said output exhibits an error, applying a fixer routine, other than a retry, to said arguments to produce new arguments;
    obtaining output from said remote computer function on said new arguments; and
    in a case where said output from said remote computer function on said new arguments is acceptable, using said output from said remote computer function on said new arguments as a corresponding output from said remote computer function on said first set of arguments;
    the method further comprising determining that said output from said remote computer function on said new arguments is acceptable by comparison to one or more acceptance criteria developed via machine learning.

11. A non-transitory computer readable medium comprising computer executable instructions which when executed by a computer cause the computer to perform a method comprising:
    obtaining output from a remote computer function on a first set of arguments;

responsive to determining that said output exhibits an error, applying a fixer routine, other than a retry, to said arguments to produce new arguments;

obtaining output from said remote computer function on said new arguments; and in a case where said output from said remote computer function on said new arguments is acceptable, using said output from said remote computer function on said new arguments as a corresponding output from said remote computer function on said first set of arguments;

wherein said method steps further comprise selecting said fixer routine from a plurality of fixer routines, and wherein said plurality of fixer routines comprise an identity function, an input validator, a database storing a most representative group of inputs, and a statistical model.

12. The non-transitory computer readable medium of claim 11, wherein said method steps are carried out without modifying program code of said remote computer function and without access to said program code of said remote computer function.

13. The non-transitory computer readable medium of claim 12, wherein said instructions, when executed, instantiate a wrapper which black-box wraps said remote computer function.

14. An apparatus comprising:
a memory;
at least one processor, coupled to said memory; and
a non-transitory computer readable medium comprising computer executable instructions which when loaded into said memory configure said at least one processor to be operative to:
  obtain output from a remote computer function on a first set of arguments;
  responsive to determining that said output exhibits an error, apply a fixer routine, other than a retry, to said arguments to produce new arguments;
  obtain output from said remote computer function on said new arguments; and
  in a case where said output from said remote computer function on said new arguments is acceptable, use said output from said remote computer function on said new arguments as a corresponding output from said remote computer function on said first set of arguments;

wherein said at least one processor is further configured by said computer executable instructions to be operative to select said fixer routine from a plurality of fixer routines, and wherein said plurality of fixer routines comprise an identity function, an input validator, a database storing a most representative group of inputs, and a statistical model.

15. The apparatus of claim 14, wherein said program code of said remote computer function is neither modified nor accessed.

16. The apparatus of claim 15, wherein said instructions configure said at least one processor to instantiate a wrapper which black-box wraps said remote computer function.

17. A method comprising:
obtaining output from a remote computer function on a first set of arguments;
responsive to determining that said output exhibits an error, applying a fixer routine, other than a retry, to said arguments to produce new arguments;
obtaining output from said remote computer function on said new arguments; and
in a case where said output from said remote computer function on said new arguments is acceptable, using said output from said remote computer function on said new arguments as a corresponding output from said remote computer function on said first set of arguments;
wherein applying a fixer routine to said arguments to produce new arguments comprises applying a plurality of fixer routines in parallel to said arguments to produce a corresponding plurality of sets of new arguments; and
wherein said plurality of fixer routines comprise an identity function, an input validator, a database storing a most representative group of inputs, and a statistical model.

* * * * *